(12) United States Patent
Lee et al.

(10) Patent No.: US 12,342,251 B2
(45) Date of Patent: Jun. 24, 2025

(54) PEER-TO-PEER COMMUNICATION FOR V2X SERVICE

(71) Applicant: LG ELECTRONICS INC., Seoul (KR)

(72) Inventors: Songgun Lee, Seoul (KR); Hakseong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 401 days.

(21) Appl. No.: 17/911,574

(22) PCT Filed: Jul. 14, 2020

(86) PCT No.: PCT/KR2020/009238
§ 371 (c)(1),
(2) Date: Sep. 14, 2022

(87) PCT Pub. No.: WO2022/014730
PCT Pub. Date: Jan. 20, 2022

(65) Prior Publication Data
US 2023/0111497 A1    Apr. 13, 2023

(51) Int. Cl.
*H04L 12/00*    (2006.01)
*H04W 4/40*    (2018.01)
*H04W 60/04*    (2009.01)
*H04W 76/14*    (2018.01)

(52) U.S. Cl.
CPC ............. *H04W 4/40* (2018.02); *H04W 60/04* (2013.01); *H04W 76/14* (2018.02)

(58) Field of Classification Search
CPC ........ H04W 4/40; H04W 76/14; H04W 60/04
See application file for complete search history.

(56) References Cited

U.S. PATENT DOCUMENTS

| | | | |
|---|---|---|---|
| 2012/0179829 A1 | 7/2012 | George | |
| 2014/0304419 A1* | 10/2014 | Yoon | H04W 52/0206 709/228 |
| 2018/0234895 A1 | 8/2018 | Shin et al. | |
| 2019/0200228 A1* | 6/2019 | Adrangi | H04L 9/3268 |
| 2020/0029268 A1 | 1/2020 | Russell et al. | |

(Continued)

FOREIGN PATENT DOCUMENTS

| | | |
|---|---|---|
| CN | 105359488 A | 2/2016 |
| CN | 105391817 A | 3/2016 |

(Continued)

OTHER PUBLICATIONS

3GPP, 3rd Generation Partnership Project; Technical Specification Group Services and System Aspects; Architecture enhancements for V2X services (Release 16), Technical Specification, Sections 4.4.2-4.5.1 of 3GPP TS 23.285 V16.3.0, Jul. 9, 2020, total pp. 38.

(Continued)

*Primary Examiner* — Noel R Beharry
*Assistant Examiner* — Lionel Preval
(74) *Attorney, Agent, or Firm* — Birch, Stewart, Kolasch & Birch, LLP

(57) ABSTRACT

Provided is peer-to-peer (P2P) communication for a vehicle-to-everything (V2X) service. A V2X apparatus establishes a P2P connection with a peer V2X apparatus on the basis of a V2X ID of the V2X apparatus.

6 Claims, 22 Drawing Sheets

(56) References Cited

U.S. PATENT DOCUMENTS

| | | | |
|---|---|---|---|
| 2020/0053125 | A1 | 2/2020 | Ngo et al. |
| 2021/0344513 | A1* | 11/2021 | Russell ............ H04L 9/0891 |

FOREIGN PATENT DOCUMENTS

| | | |
|---|---|---|
| CN | 107683613 A | 2/2018 |
| EP | 3 361 761 B1 | 4/2020 |
| KR | 10-2018-0093671 A | 8/2018 |
| KR | 10-2019-0086408 A | 7/2019 |
| KR | 10-2020-0039412 A | 4/2020 |
| TW | 201715873 A | 5/2017 |

OTHER PUBLICATIONS

3GPP, 3rd Generation Partnership Project; Technical Specification Group Services and System Aspects; Policy and charging control architecture (Release 16), Technical Specification, Section 6.2.3 of 3GPP TS 23.203 V16.2.0, Dec. 22, 2019, total pp. 267.

"Service continuity for ProSe UE-to-network relay," 3GPP TSG WG2 #90, R2-152546, May 2015, 5 pages total.

3GPP TS 23.285, 3rd Generation Partnership Project; Technical Specification Group Services and System Aspects; Architecture enhancements for V2X services (Release 16), vol. 16.3.0, Jul. 9, 2020, XP051924375, pp. 1-38.

3GPP TSG-CT WG1 Meeting #122-e Electronic meeting, Triggering service request procedure for V2X communication over PCS interface, C1-200595, Feb. 20-28, 2020, total pp. 5.

Extended European Search Report for European Application No. 20945169.9, dated Mar. 4, 2024.

Jeong et al., "A hybrid V2X System for Safety-Critical Applications in VANET," IEEE 4th International Conference on Cyber-Physical Syaytems, Networks, and Applications, 2016, pp. 13-18.

* cited by examiner

FIG. 1
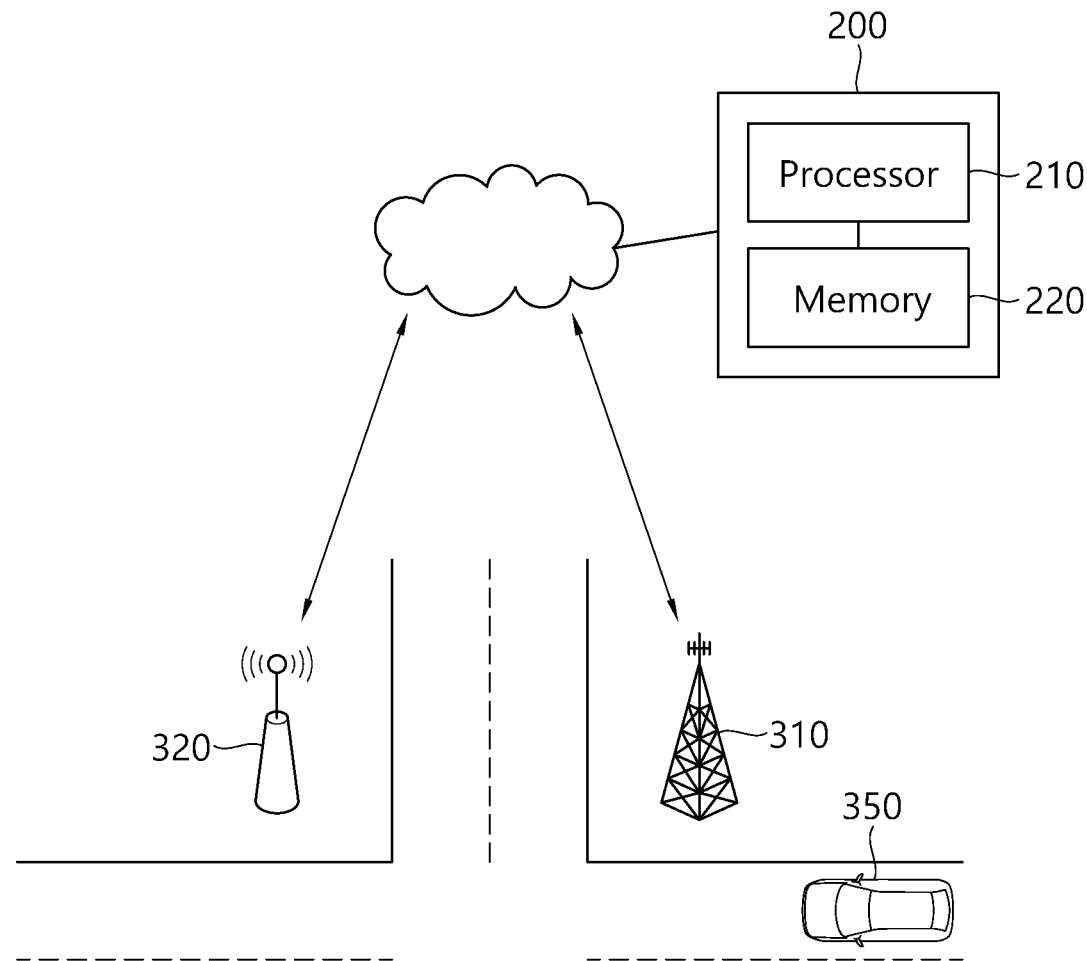
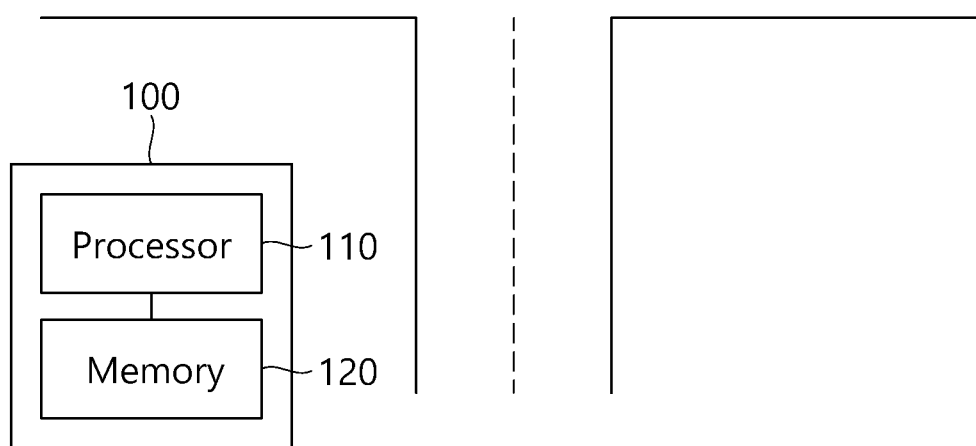

FIG. 3
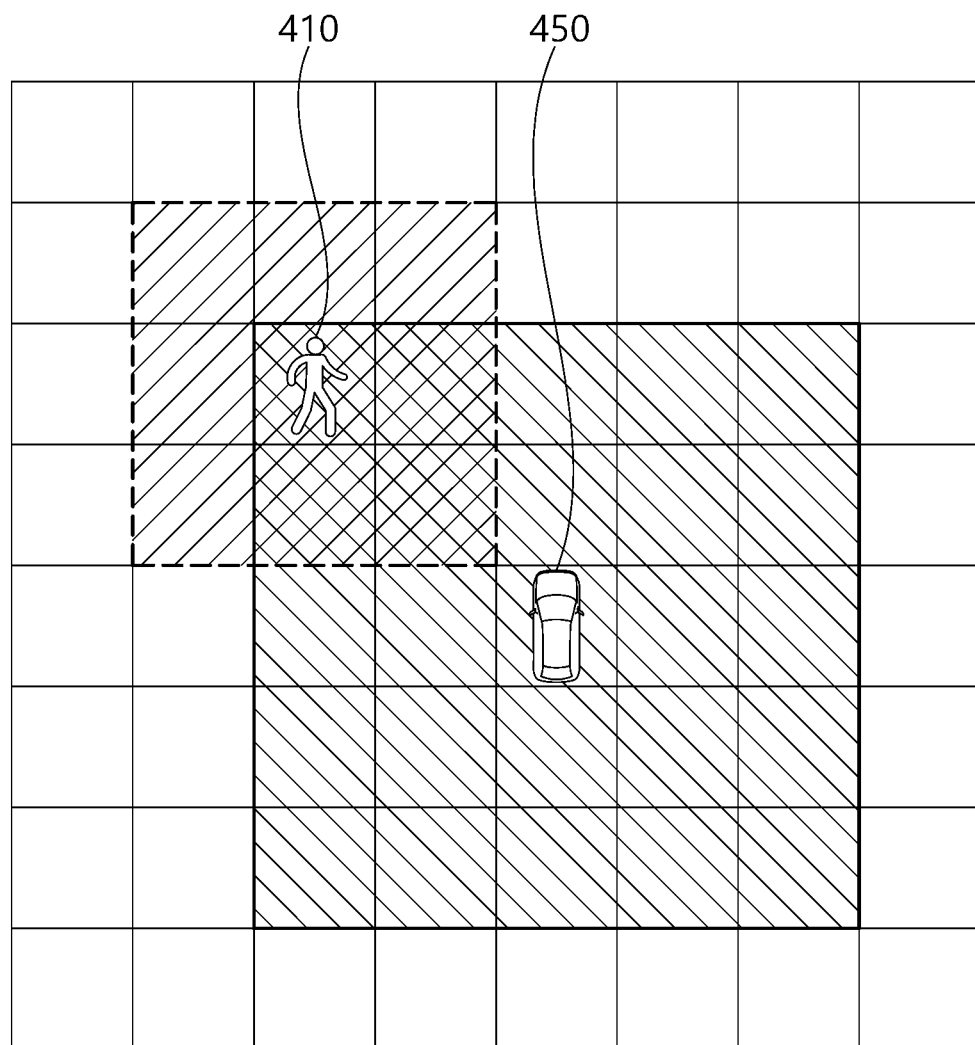
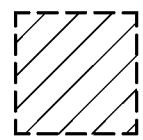 : First Subscription Area
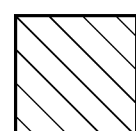 : Second Subscription Area

FIG. 8
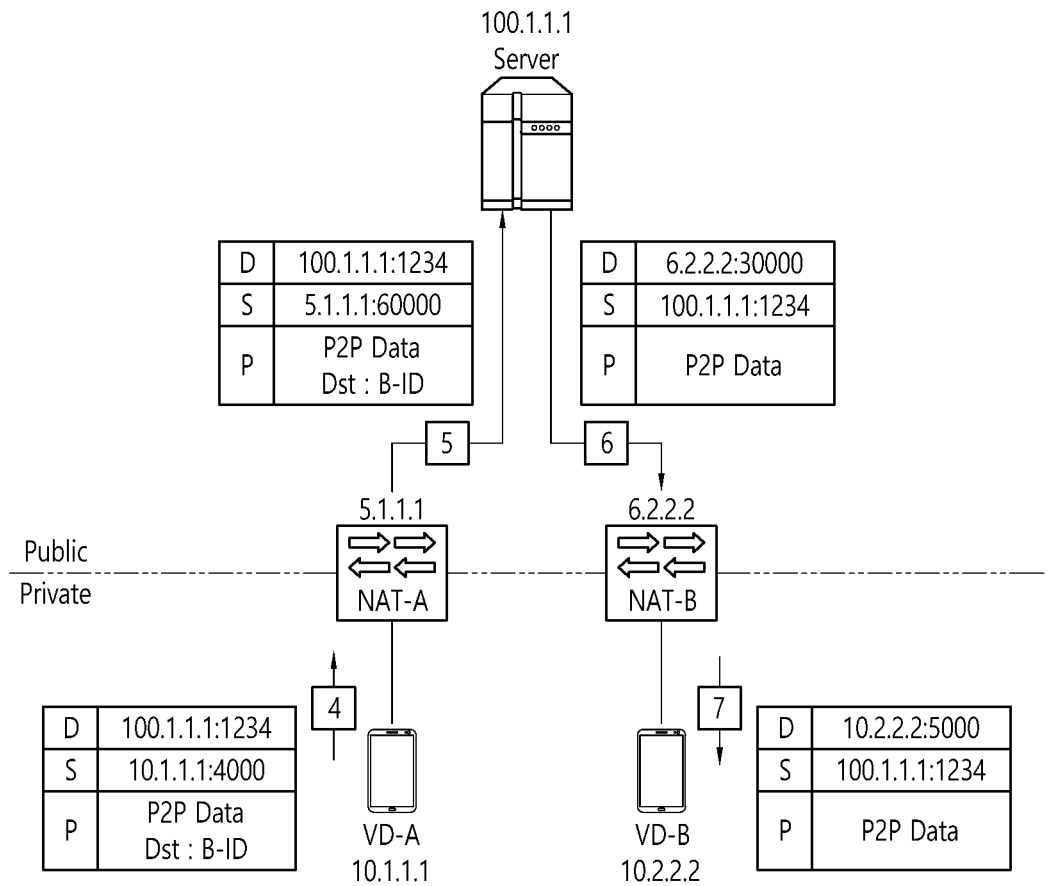
NAT-A : Address and Port-Dependent Mapping & Filtering
| Binding (Mapping) Table | Inbound Packet Filtering Table |
|---|---|
| 10.1.1.1:4000 ↔ 5.1.1.1:60000 | Allow {100.1.1.1:1234} to {5.1.1.1:60000} |
Address and Port-Dependent mapping
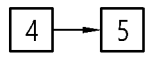
NAT-B : Address and Port-Dependent Mapping & Filtering
| Binding (Mapping) Table | Inbound Packet Filtering Table |
|---|---|
| 10.1.1.1:5000 ↔ 6.2.2.2.2:30000 | Allow {100.1.1.1:1234} to {6.2.2.2:30000} |
Address and Port-Dependent filtering
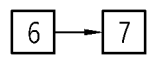

FIG. 10
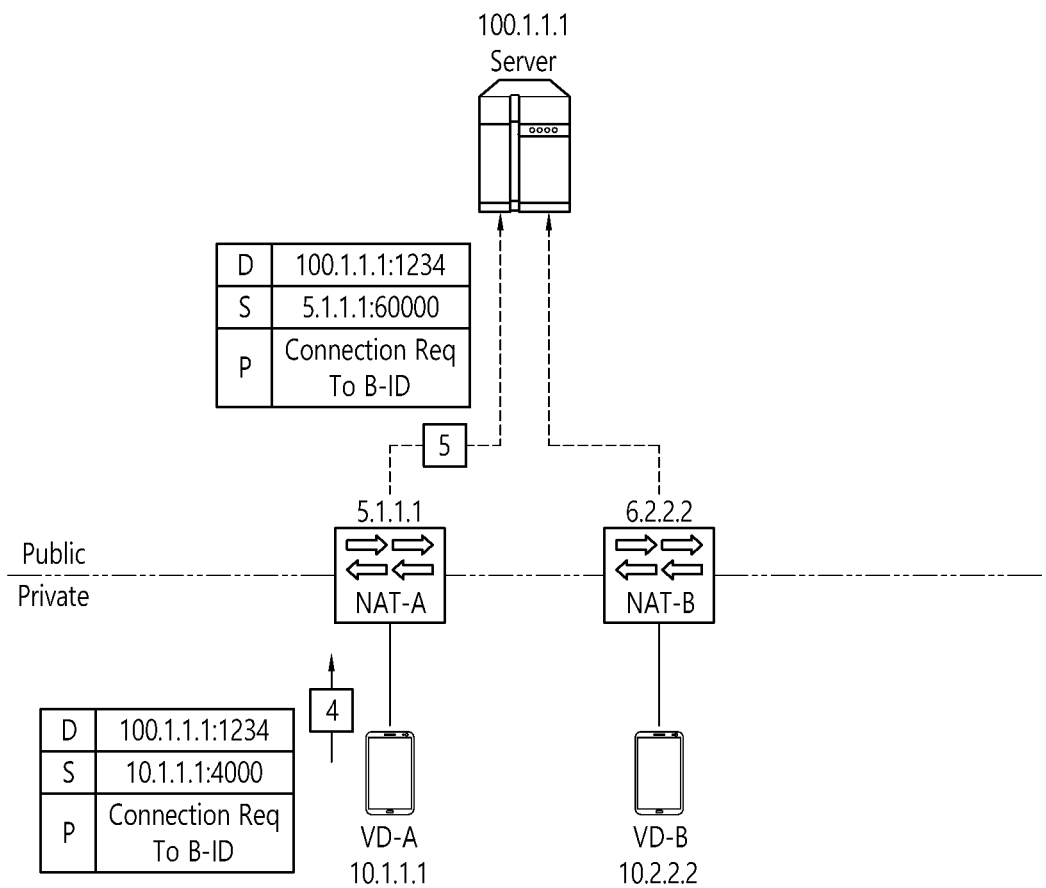
NAT-A : Address and Port-Dependent Mapping & Filtering
| Binding (Mapping) Table | Inbound Packet Filtering Table |
|---|---|
| 10.1.1.1:4000 ↔ 5.1.1.1:60000 | Allow {100.1.1.1:1234} to {5.1.1.1:60000} |
Endpoint-Dependent mapping
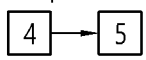
NAT-B : Address and Port-Dependent Mapping & Filtering
| Binding (Mapping) Table | Inbound Packet Filtering Table |
|---|---|
| 10.1.1.1:5000 ↔ 6.2.2.2.2:30000 | Allow {100.1.1.1:1234} to {6.2.2.2:30000} |

FIG. 12
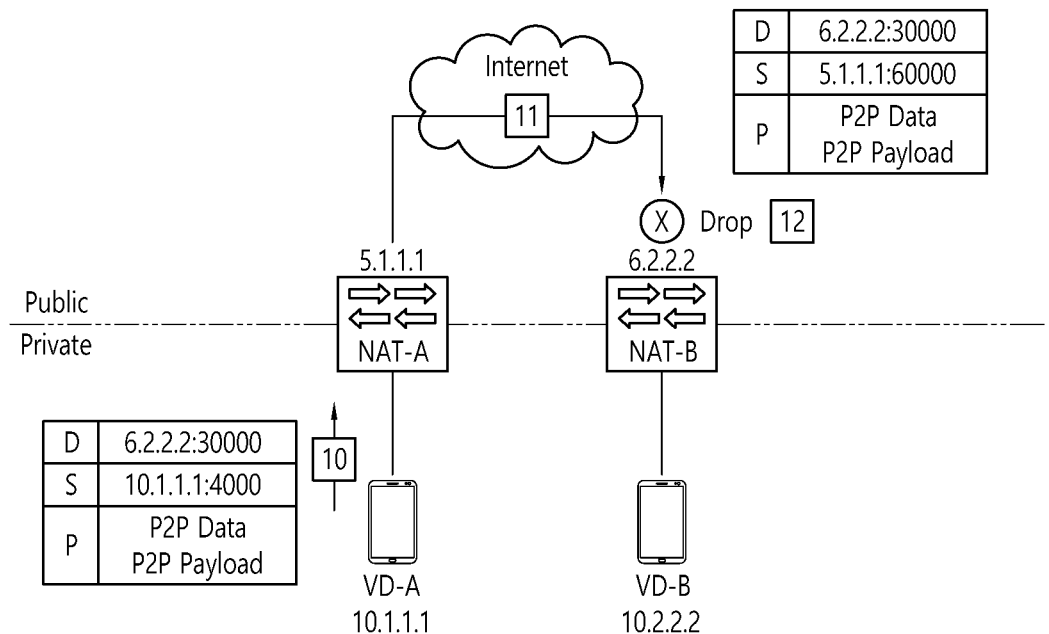
NAT-A : Address and Port-Dependent Mapping & Filtering
| Binding (Mapping) Table | Inbound Packet Filtering Table |
|---|---|
| 10.1.1.1:4000 ↔ 5.1.1.1:60000 | Allow {100.1.1.1:1234} to {5.1.1.1:60000} |
| | Allow {6.2.2.2:30000} to {5.1.1.1:60000} |
Endpoint-Dependent mapping 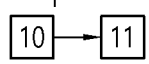
Filtering Entry created
(UDP Hole Punching !!!) 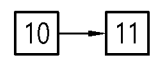
NAT-B : Address and Port-Dependent Mapping & Filtering
| Binding (Mapping) Table | Inbound Packet Filtering Table |
|---|---|
| 10.1.1.1:5000 ↔ 6.2.2.2.2:30000 | Allow {100.1.1.1:1234} to {6.2.2.2:30000} |
Endpoint-Dependent filtering 

FIG. 13
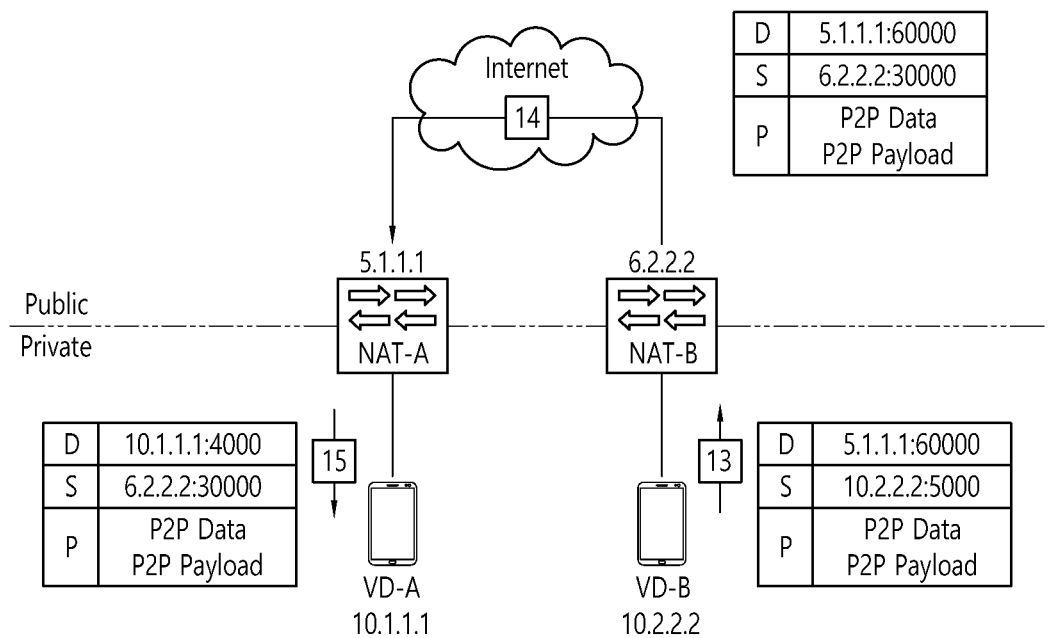
NAT-A : Address and Port-Dependent Mapping & Filtering
| Binding (Mapping) Table | Inbound Packet Filtering Table |
|---|---|
| 10.1.1.1:4000 ↔ 5.1.1.1:60000 | Allow {100.1.1.1:1234} to {5.1.1.1:60000} |
| | Allow {6.2.2.2:30000} to {5.1.1.1:60000} |
Endpoint-Dependent filtering
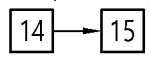
NAT-B : Address and Port-Dependent Mapping & Filtering
| Binding (Mapping) Table | Inbound Packet Filtering Table |
|---|---|
| 10.1.1.1:5000 ↔ 6.2.2.2.2:30000 | Allow {100.1.1.1:1234} to {6.2.2.2:30000} |
| | Allow {5.1.1.1:60000} to {6.2.2.2:30000} |
Endpoint-Dependent mapping
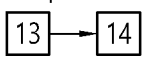
Filtering Entry created
(UDP Hole Punching !!!)
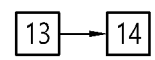

FIG. 15

| | Application Layer | P2P Application Layer |
|---|---|---|
| X.509 | Message Layer | P2P Message Layer |
| | TLS | DTLS |
| | TCP | UDP |
| | IP ||

FIG. 22
(A)
(B)

PEER-TO-PEER COMMUNICATION FOR V2X SERVICE

CROSS REFERENCE TO RELATED APPLICATIONS

This application is the National Stage filing under 35 U.S.C. 371 of International Application No. PCT/KR2020/009238, filed on Jul. 14, 2020, which is hereby expressly incorporated by reference into the present application.

BACKGROUND OF THE DISCLOSURE

Field

The present disclosure relates to a method for providing peer-to-peer (P2P) communication for vehicle-to-everything (V2X) service, and a device using the same.

Related Art

A vehicle is an apparatus which moves a passenger from one place to another place. A representative example is a car. A vehicle-to-everything (V2X) communication technology, which means vehicle-to-object communication, refers to a technology in which the vehicle communicates with other vehicles, pedestrians, road infrastructures, servers, and the like to provide a series of services.

For the V2X, standardization organizations such as Institute of Electrical and Electronics Engineers (IEEE), 3rd Generation Partnership Project (3GPP), etc. provide various communication specifications. Dedicated Short Range Communications (DSRC) is the communication standard protocol based on IEEE 802.11p. Cellular-V2X (C-V2X) is the communication standard protocol based on cellular communication protocol of 3GPP. In general, V2X has focused on vehicle safety through direct communication between vehicles, but recently V2X includes vehicle-to-infrastructure communication for communicating with peripheral devices via a network.

Attempts are being made to extend V2X technology to be applied to pedestrians and other electronic devices, rather than simply being used for vehicle safety, such as vehicle-to-vehicle and vehicle-to-peripheral devices.

SUMMARY OF THE DISCLOSURE

The present disclosure provides a device and a method for vehicle-to-everything (V2X) service.

In an aspect, a device for vehicle-to-everything (V2X) service includes a processor, and a memory operatively coupled with the processor and configured to store instructions that, when executed by the processor, cause the server to perform functions. The functions include transmitting a registry session message to a V2X server, the registry session message including a V2X ID of the device and a private internet protocol (IP) address of the device, transmitting a connection request message for requesting a peer-to-peer (P2P) connection with a peer device to the V2X server, the connection request message including a V2X ID of the peer device, receiving a connection response message from the V2X server, the connection response message including the V2X ID of the peer device and a private IP address of the peer device, and establishing the P2P connection with the peer device.

In another aspect, a method for vehicle-to-everything (V2X) service is provided. The method performed by a V2X device includes transmitting a registry session message to a V2X server, the registry session message including a V2X ID of the V2X device and a private internet protocol (IP) address of the V2X device, transmitting a connection request message for requesting a peer-to-peer (P2P) connection with a peer device to the V2X server, the connection request message including a V2X ID of the peer device, receiving a connection response message from the V2X server, the connection response message including the V2X ID of the peer device and a private IP address of the peer device, and establishing the P2P connection with the peer device.

In still another aspect, a non-transitory computer-readable medium having computer-readable instructions stored thereon that are executable by a processor perform functions is provided. The functions include transmitting a registry session message to a V2X server, the registry session message including a V2X ID of a V2X device and a private internet protocol (IP) address of the V2X device, transmitting a connection request message for requesting a peer-to-peer (P2P) connection with a peer device to the V2X server, the connection request message including a V2X ID of the peer device, receiving a connection response message from the V2X server, the connection response message including the V2X ID of the peer device and a private IP address of the peer device, and establishing the P2P connection with the peer device.

It is possible to provide V2X services to more diverse users as well as vehicles.

BRIEF DESCRIPTION OF THE DRAWINGS

FIG. 1 shows a system to which an embodiment of the present specification is applied.

FIG. 3 shows an example in which a subscription area is set.

FIG. 8 shows an example of data transfer in P2P communication using a relay.

FIGS. 10 and 11 show a process of receiving information for P2P communication from a V2X server.

FIGS. 12 to 14 show a process of performing P2P communication.

FIG. 15 shows an example of a protocol stack to which a P2P function is added.

FIG. 22 shows another example of an application to which P2P communication for V2X is applied.

DETAILED DESCRIPTION OF THE EMBODIMENTS

Figure 2:
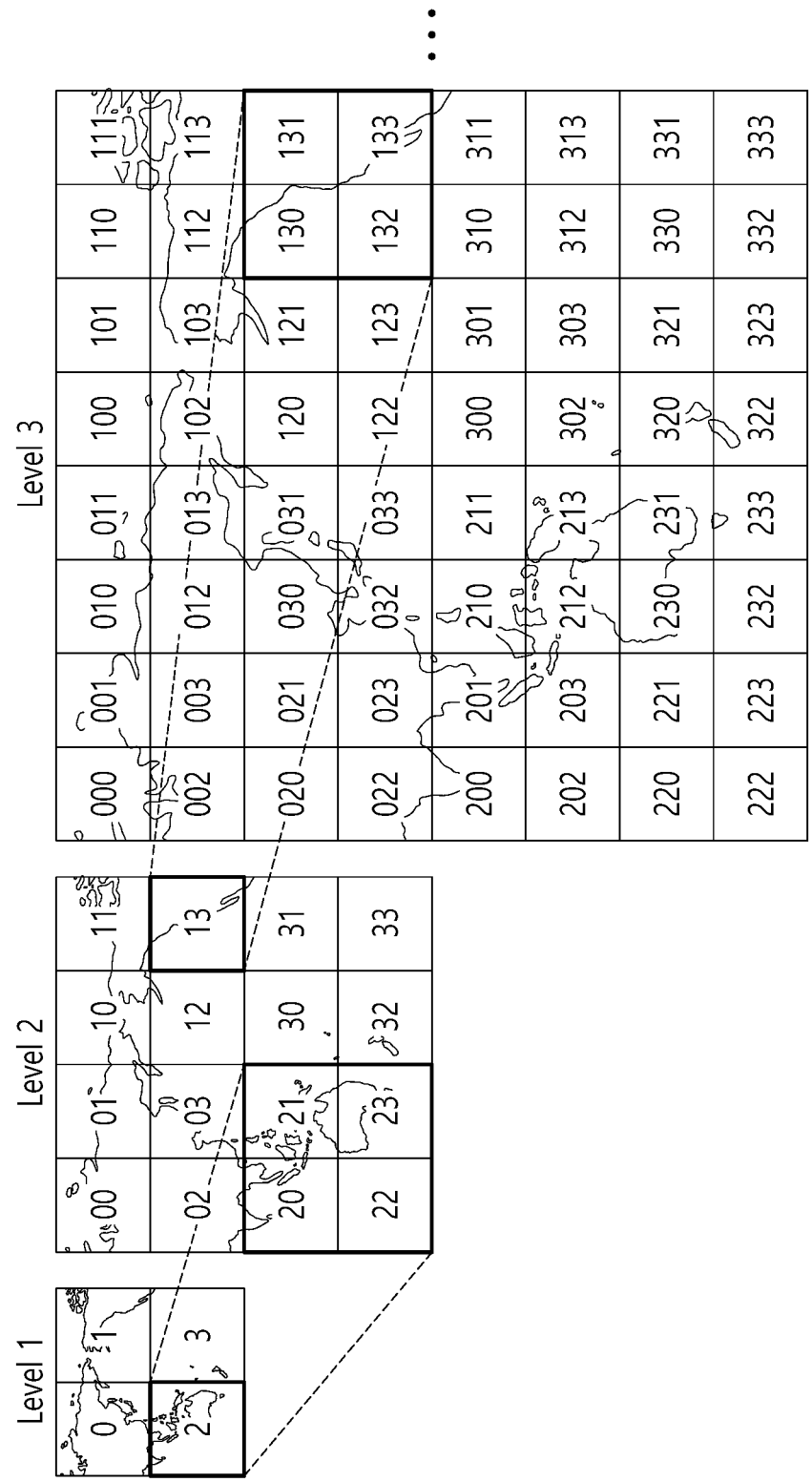
FIG. 2 shows an example of a tile using a quadtree.

Hereinafter, the embodiments disclosed in the present specification will be described in detail with reference to the accompanying drawings, but the same or similar components are assigned the same reference numbers regardless of reference numerals, and redundant description thereof will be omitted. The suffixes "module" and "unit" for the components used in the following description are given or mixed in consideration of only the ease of writing the specification, and do not have distinct meanings or roles by themselves. In addition, in describing the embodiments disclosed in the present specification, if it is determined that detailed descriptions of related known technologies may obscure the gist of the embodiments disclosed in the present specification, the detailed description thereof will be omitted. In addition, the accompanying drawings are only for easy understanding of the embodiments disclosed in the present specification, and the technical ideas disclosed in the present specification are not limited by the accompanying drawings.

Terms including an ordinal number, such as first, second, etc., may be used to describe various elements, but the elements are not limited by the terms. The above terms are used only for the purpose of distinguishing one component from another.

When an element is referred to as being "connected" or "coupled" to another element, it is understood that it may be directly connected or coupled to the other element, but other elements may exist in between. On the other hand, when it is mentioned that a certain element is "directly connected" or "directly coupled" to another element, it should be understood that no other element is present in the middle.

The singular expression includes the plural expression unless the context clearly dictates otherwise.

In the present application, terms such as "comprises" or "have" are intended to designate that the features, numbers, steps, operations, components, parts, or combinations thereof described in the specification exist, but it is to be understood that this does not preclude the possibility of addition or existence of one or more other features, numbers, steps, operations, components, parts, or combinations thereof.

A vehicle according to an embodiment of the present specification can be defined as a means of transport traveling on a road or track. Vehicles may include automobiles, ships, aircraft, trains, motorcycles, bicycles, and the like. The vehicle may include an internal combustion engine vehicle having an engine as a power source, a hybrid vehicle having an engine and an electric motor as a power source, an electric vehicle having an electric motor as a power source, and combinations thereof.

A vehicle-to-everything (V2X) device according to an embodiment of the present specification refers to a device that provides V2X functions and V2X services to users based on software, and is also referred to as a SoftV2X device. The V2X device may be implemented based on hardware and/or software in an electronic device operated by a user such as User Equipment (UE), mobile station (MS), mobile terminal (MT), user terminal (UT), cellular phone, laptop, handheld device, tablet, drone, consumer electronics, and the like. The V2X device may be mounted on a vehicle or electronic device as an on-board unit (OBU) to provide V2X functions and services to the vehicle. A V2X device disposed inside or outside the vehicle may be connected to the vehicle through a wireless interface to provide V2X functions and V2X services to the vehicle.

FIG. 1 shows a system to which an embodiment of the present specification is applied.

A system includes a V2X device 100 and a V2X server 200. The V2X device 100 may communicate with the V2X server 200 through the base station 310 or a Road Side Unit (RSU) 320. The V2X device 100 may communicate with the base station 310, the RSU 320, a neighbor vehicle 350 and/or a neighbor V2X device using a wireless communication protocol. There is no limitation on the wireless communication protocol. The wireless communication protocol may include Dedicated Short Range Communications (DSRC), Cellular-V2X (C-V2X), WiFi, BLUETOOTH and/or cellular communication protocols based on 3rd Generation Partnership Project (3GPP) (e.g. Wideband Code Division Multiple Access (WCDMA), Long Term Evolution (LTE), New Radio (NR), etc.).

The V2X server 200 receives one or more V2X messages from the V2X device 100 within a managed area. The V2X server 200 may forward the one or more collected V2X messages to the subscribing V2X device 100.

The V2X message may periodically or aperiodically be transmitted to the V2X server 200 by the V2X device 100 (or RSU 320), and is a message providing status information of the V2X device 100 (or device managed by the RSU 320). For example, the V2X device 100 may transmit 10 V2X messages per second. The V2X server 200 collects V2X messages from multiple V2X devices, and forwards the V2X messages to subscribing V2X devices.

The following table shows examples of information elements included in the V2X message. Not all information elements are required, and names are examples only. Information elements may be added/changed/deleted according to policies or circumstances.

TABLE 1

| Name | Description |
| --- | --- |
| V2X ID | A temporary identifier (ID) for identifying the V2X device sending this message. It is randomly selected by the V2X device and may be changed periodically. The size can be 4 octets. |
| Position | Indicates the location of the V2X device. May contain latitude, longitude and elevation. |
| Position Accuracy | Including the quality of various parameters used to model the accuracy of positioning. |
| Velocity | Indicates the velocity of the V2X device. |
| Heading | Indicates the current heading (direction of motion) of the V2X device. |
| Path History | defines a geometric path reflecting V2X device's movement over some period of time and/or distance |
| Acceleration | Indicates the acceleration of the V2X device. May include a set of acceleration values for three orthogonal directions of the V2X device: a longitudinal axis, a lateral axis, and a vertical axis. |
| Device Type | Indicates the type of V2X device. Example: pedestrian, automobile, bicycle, etc. |
| Publishing Area | To be described later |

The V2X message transmitted by the V2X device 100 to the V2X server 200 is called an uplink (UL) V2X message, and the V2X message transmitted by the V2X server 200 to the V2X device 100 is called a downlink (DL) V2X message.

The V2X device 100 may include a processor 110 and a memory 120. The processor 110 implements the functions of the V2X device 100 and may include one or more software modules. The V2X device 100 may further include various additional devices according to functions such as a display, a user interface, and a wireless modem.

The V2X server 200 is connected to one or more base stations 310 and/or RSU 320 and includes computing hardware that provides V2X functions and V2X services to the V2X device 100. The V2X server 200 may be a Mobile/Multi-access Edge Computing (MEC)-based server or a centralized-based server. The V2X server 200 may be called another name, such as a Geocast server or a SoftV2X server. The V2X server 200 may include a processor 210 and a memory 220. The processor 210 implements the function of the V2X server 200, and may include one or more software modules.

The processors 110 and 210 may include Application-Specific Integrated Circuits (ASICs), Central Processing Unit (CPU), Application Processor (AP), Digital Signal Processor (DSP), Digital Signal Processing Device (DSPD), Programmable Logic Device (PLD), Field Programmable Gate Array (FPGA), micro-controller, chipset, logic circuits, data processing device and/or combinations thereof. In the software implementation for the following embodiments, the software code for performing the functions described herein may be stored in the memories 120 and 220 and executed by the processors 110 and 210.

Memories 120 and 220 may store information accessible by processors 110 and 210. The information may include instructions executable by the processors 110 and 210 and/or data processed by the processor. Memories 120 and 220 may include any form of computer-readable medium operable to store information. For example, the memories 120 and 220 include read only memory (ROM), random access memory (RAM), digital video disc (DVD), optical disc, flash memory, solid state drive (SSD), hard drive and combinations thereof.

Message Queuing Telemetry Transport (MQTT) is used as a message queuing protocol between the V2X device 100 and the V2X server 200, but this is only an example. Advanced Message Queuing Protocol (AMQP), HyperText Transfer Protocol (HTTP), and/or vendor specific protocols may be used.

Now, setting an area for V2X service will be described in more detail. Hereinafter, a tile refers to a geographic basic unit for setting a subscription area. Hereinafter, a rectangle is shown in the form of a tile, but it is only an example. There are no restrictions on the shape of the tile, such as polygons or circles.

FIG. 2 shows an example of a tile using a quadtree.

The quadtree represents a partition of space in two dimensions by decomposing a map (i.e. world map) into four equal quadrants, subquadrants, and so on. The size of a quadrant varies according to a zoom level, and each quadrant corresponds to a tile. Here, the case where the levels are 1, 2, and 3 is shown. The larger the level, the smaller the size of the tile. At each level, a unique ID is assigned to a tile. The tile ID may have the number of bits corresponding to the level.

The V2X device may acquire the ID of the tile in which it is located based on its location information (e.g. latitude and longitude). The V2X device and/or the V2X server may adjust the size of the area by adjusting the level according to the situation.

In the following embodiment, the area for the V2X service is defined as follows.

Management area: The area managed by the V2X server. The management area includes one or more tiles.

Subscription area: The area where the V2X device requests a subscription to the V2X server. The subscription area may be referred to as another name, such as a concerned area, an impact area, or a geocast area. The subscription area contains one or more tiles. The subscription area may be included in one management area, and may be defined across a plurality of management areas managed by a plurality of V2X servers.

Publishing area: The area where the V2X device publishes V2X messages to the V2X server. The publishing area may include one tile in each level. The publishing area may indicate a tile where the V2X device is currently located. Some or all of the publishing area may overlap with the subscription area.

FIG. 3 shows an example in which a subscription area is set.

A first subscription area is set to the first V2X device 410, and a second subscription area is set to the second V2X device 450. Each V2X device can set/change/delete the subscription area periodically or aperiodically (e.g. when its location is changed). Each V2X device can request setting/change/deletion of the subscription area to the V2X server.

The number of tiles included in the first subscription area is 9 and the number of tiles included in the second subscription area is 25, but the number of tiles included in the subscription area or the shape of the subscription area is not limited. The subscription area may include a tile in which the V2X device is located. Alternatively, the subscription area may include one or more tiles other than a tile in which the V2X device is located.

The first V2X device 410 may generate a first V2X message and periodically send the first V2X message to the V2X server. The second V2X device 450 may generate a second V2X message and periodically send the second V2X message to the V2X server.

The V2X server may forward one or more V2X messages received in or around a subscription area to the V2X device related to the subscription area.

A device that sets a subscription area may be referred to as a "subscriber device". A device that transmits a V2X message to a V2X server can be referred to as a "provider device". A V2X device may be a subscriber device, a provider device, or both a subscriber device and a provider device. The V2X server may forward the V2X messages transmitted by the provider devices in the management area to the subscriber device.

The V2X server may deliver the V2X message of a provider device "associated" to the subscription area of a subscriber device to the subscriber device. A provider device associated with a subscription area of a subscriber device may be referred to as a "subscribed provider device". The provider device associated with the subscription area of the subscriber device may satisfy at least one of the following conditions (i) to (iii): (i) Part or all of the publishing area of the provider device overlaps with the subscription area of the subscriber device. (ii) some or all of the subscription area of the provider device overlaps the subscription area of the subscriber device; and/or (iii) The location where the provider device transmits the V2X message is within the subscription area of the subscriber device.

According to condition (i) or (iii), the V2X server delivers V2X messages received in the first subscription area to the first V2X device 410. The V2X server delivers V2X messages received in the second subscription area to the second V2X device 450.

Since the first V2X device 410 is located in the second subscription area, the V2X server may forward the first V2X message to the second V2X device 450. The second V2X device 450 is a subscriber device, and the first V2X device 410 is a subscribed provider device.

Since the second V2X device 450 is not located in the first subscription area (which means that condition (i) or condition (iii) is not satisfied), the V2X server does not forward the second V2X message to the first V2X device 410. The second V2X device 450 is not a provider device of the first V2X device 410. If condition (ii) is considered, the second V2X device 450 may be a provider device of the first V2X device 410.

Figure 4:
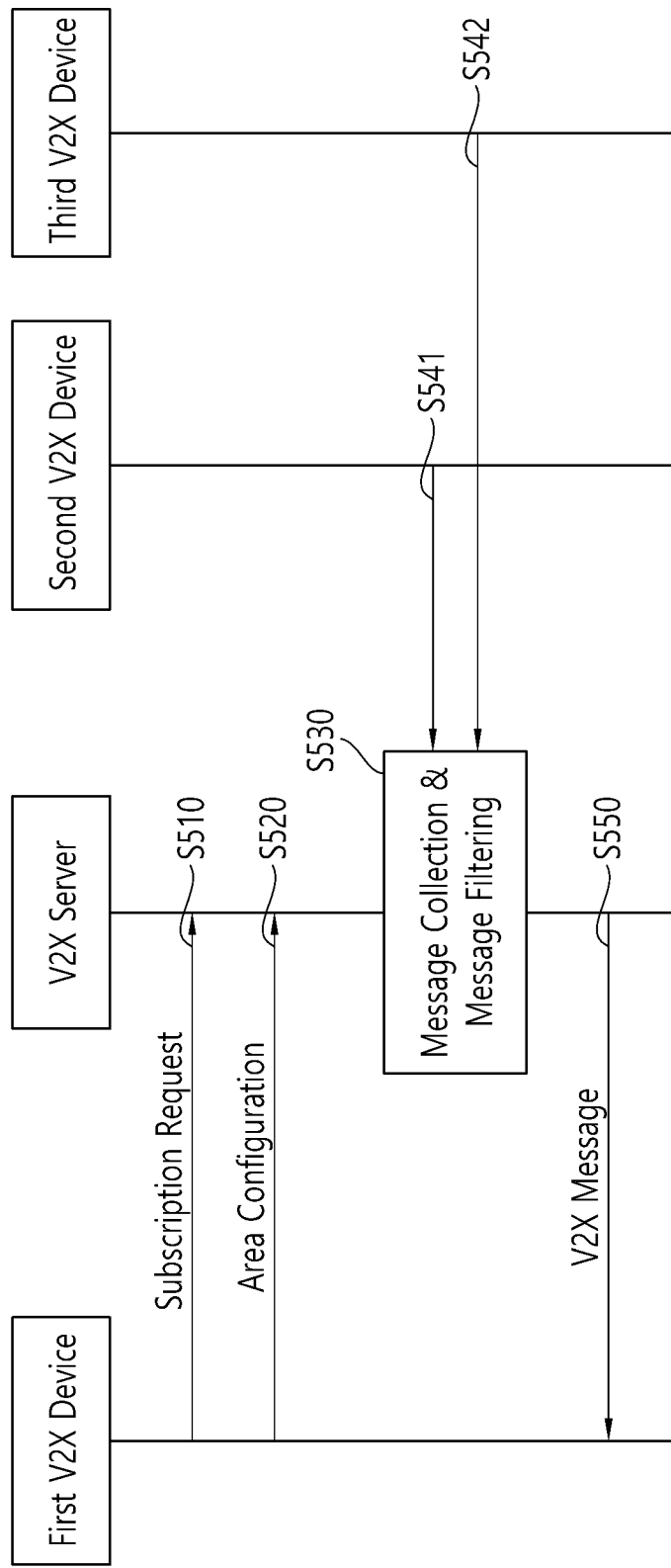
FIG. 4 is a flowchart illustrating a method for a V2X service according to an embodiment of the present specification.

FIG. 4 is a flowchart illustrating a method for a V2X service according to an embodiment of the present specification.

In step S510, a V2X device sends a subscription request for requesting subscription of the V2X service to a V2X server. The subscription request may include information about the identifier, location, etc. of the V2X device. The V2X server may transmit a subscription response for granting or rejecting subscription to the V2X device in response to the subscription request.

In step S520, the V2X device may send the area configuration related to the V2X service to the V2X server. The area configuration may be included in a separate message or included in the subscription request. The area configuration includes information about configuration and/or modification of the subscription area.

In step S530, the V2X server may collect V2X messages from V2X devices in the management area, and perform message filtering.

The V2X server receives the first V2X message from the second V2X device (step S541), and receives the second V2X message from the third V2X device (step S542). Assume that the second V2X device belongs to the subscription area of the first V2X device, but the third V2X device does not belong to the subscription area of the first V2X device.

In step S550, the V2X server publishes the first V2X message belonging to the subscription area of the first V2X device to the first V2X device. The first V2X device is a subscriber device and the second V2X device is a provider device. Since a V2X message of the third V2X device is not delivered to the first V2X device, the third V2X device is not a provider device of the first V2X device.

If there are a plurality of V2X messages to be sent to the first V2X device, the plurality of V2X messages may be published separately or as a single message.

Message filtering is that V2X server filters the V2X messages to be transmitted to V2X devices that have completed the subscription request. Message filtering may be referred to as a process of selecting a subscribed provider device associated with a subscriber device among a plurality of provider devices. Filtering conditions may be defined differently depending on the subscription area and/or the state of the V2X device. For example, if the number of V2X devices in the subscription area is large, the filtering conditions may be modified so that more messages are filtered out. Filtering condition may be related to the degree of risk of the V2X device.

Figure 5:
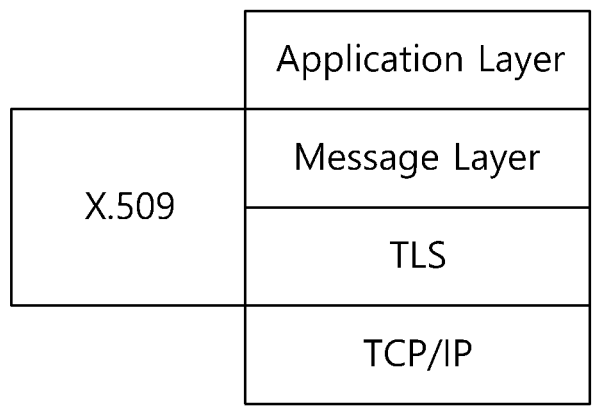
FIG. 5 shows an example of a protocol stack for a V2X service.

FIG. 5 shows an example of a protocol stack for a V2X service.

An application layer provides various V2X services such as road safety, drive assistance, traffic management, infotainment, etc. A message layer generates a message according to a predetermined message protocol for transmitting information to a target device. Although Message Queuing Telemetry Transport (MQTT) is used as a message protocol, this is only an example. Advanced Message Queuing Protocol (AMQP), HyperText Transfer Protocol (HTTP), and/or vendor specific protocols may be used.

A Transport Layer Security (TLS) is responsible for confidentiality. A Transmission control protocol/internet protocol (TCP/IP) implements an IP network interface.

A well-known X.509 certificate can be used for V2X services. This is merely an example, and an Institute of Electrical and Electronics Engineers (IEEE) 1609.2 certificate may also be used. For communication between the V2X device and the V2X server, a secure session using TLS is first established.

In legacy V2X communication based on conventional direct communication, the transmitter unilaterally sends information to the receiver, but information exchange is not possible. The V2X server only delivers the V2X message of the provider device to the subscriber device, but does not help all V2X devices exchange information with each other.

There is a demand for peer-to-peer (P2P) applications between V2X devices. In the V2X environment, P2P applications include chat, voice talk, see-through, data sharing, sensor sharing, and the like.

Figure 6:
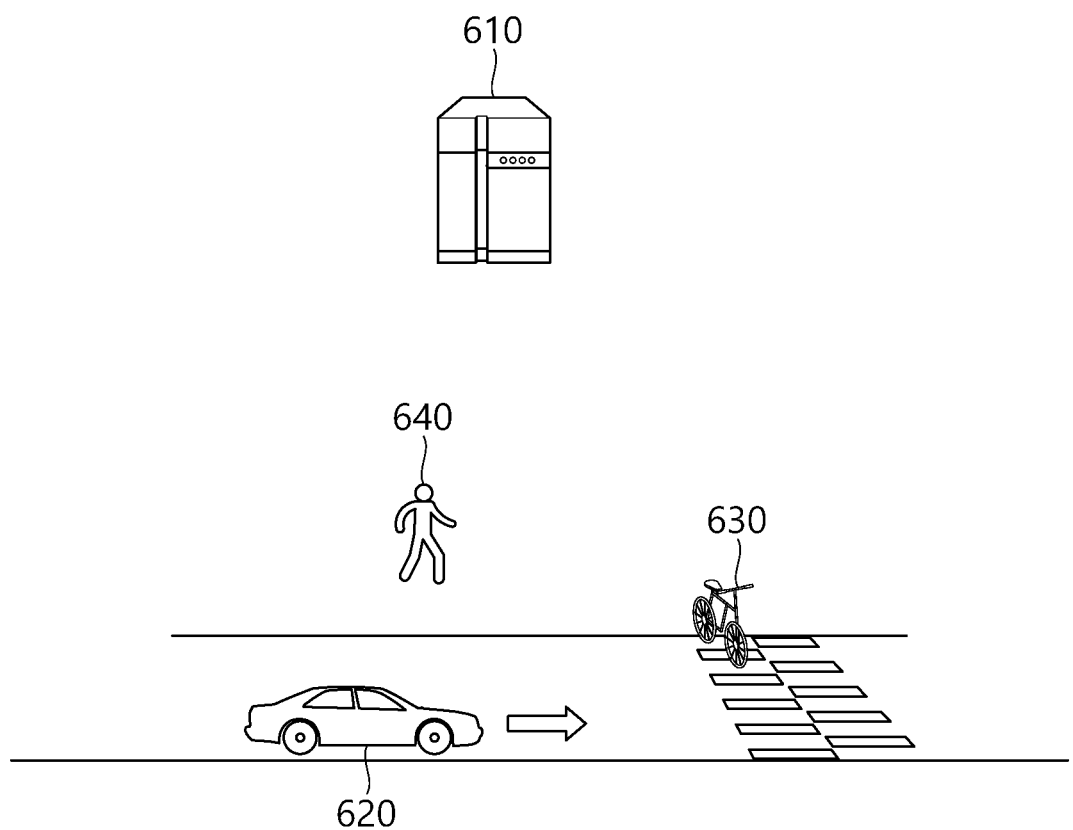
FIG. 6 shows an example of peer-to-peer (P2P) communication using a V2X service.

FIG. 6 shows an example of peer-to-peer (P2P) communication using a V2X service.

A vehicle 620, a bicycle 630, and a pedestrian 640 are all V2X devices. For example, the vehicle 620, the bicycle 630, and the pedestrian 640 may carry a V2X device, may be equipped with a V2X device, or may be connected to a V2X device. It is assumed that the vehicle 620, the bicycle 630, and the pedestrian 640 have all completed the subscription request with the V2X server 610, and the subscription areas are also overlapped with each other. The V2X server 610 delivers the V2X message of one of the vehicle 620, the bicycle 630 and the pedestrian 640 to the remains.

The vehicle 620 may receive a first V2X message of the bicycle 630 and may predict that the bicycle 630 moves on the driving path of the vehicle 620 and there is a risk of collision. The vehicle 620 sends a second V2X message with this threat notification to the V2X server, and the V2X server may forward the V2X message to the bicycle 630 and the pedestrian 640. However, even if the bicycle 630 receives the second V2X message, it is difficult to properly inform a cyclist if the risk detection is delayed or no risk detection application is applied. Also, although the threat notification is also delivered to the pedestrian 640, this may be an unnecessary notification in practice.

The following embodiment proposes a method for performing P2P communication under a V2X environment.

All mobile phones are connected to the service provider's Network Address Translation (NAT) and have a private IP address. For P2P communication, a NAT traversal technique is required to know the public IP address of the other party.

There are three main techniques in NAT Traversal: relaying, connection reversal, and user datagram protocol (UDP) hole punching. Hereinafter, a relay performing P2P communication via a V2X server and UDP hole punching not via a V2X server are proposed.

In the following drawings, 'D' denotes a destination address, 'S' denotes a source address, and 'P' denotes a payload of a message. VD-A is a first V2X device, VD-B is a second V2X device. A-ID is a V2X ID of VD-A, B-ID is a V2X ID of VD-B. NAT-A is a NAT associated with VD-A, and NAT-B is a NAT associated with VD-B. The address or port number of each device is merely an example.

VD-A and VD-B each send a subscription request to the V2X server, and subscription areas for devices are set. VD-A receives at least one V2X message from VD-B, and VD-B receives at least one V2X message from VD-A. VD-A and VD-B share each other's V2X ID.

Figure 7:
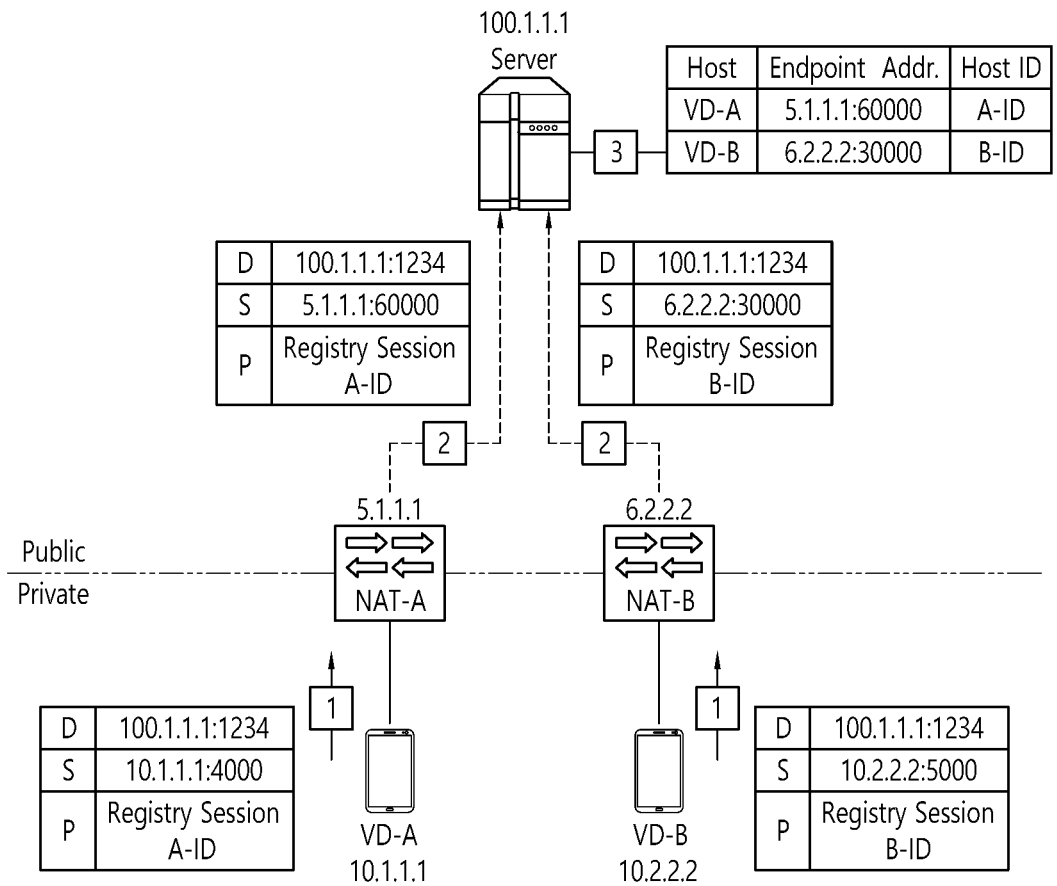
FIG. 7 shows an example of a connection in P2P communication using a relay.

FIG. 7 shows an example of a connection in P2P communication using a relay. The relay method is a concept of relaying P2P data packets through an external server having a public IP address when direct communication between two V2X devices with private IP addresses is not possible.

In step 1, assume that VD-A's private IP address is '10.1.1.1' and VD-B's private IP address is '10.2.2.2'. VD-A and VD-B each send a registry session message to establish a connection to the V2X server. This message contains either A-ID or B-ID.

Each V2X device generates its own V2X ID and sends a V2X message with the V2X ID to the V2X server. The V2X device receives the V2X message of the surrounding V2X device through the V2X server, and can know the location and V2X ID of the surrounding V2X device.

In step 2, the registry session messages are delivered to the V2X server through NAT-A/NAT-B, and a TCP connection or UDP connection between VD-A and V2X server, and VD-B and V2X server is established. NAT-A/NAT-B determines a binding entry and a filtering entry shown in FIG. 7.

In step 3, the V2X server stores the public IP addresses/port numbers, private IP addresses/port numbers and V2X IDs of VD-A and VD-B.

FIG. 8 shows an example of data transfer in P2P communication using a relay. This shows a process of receiving information for P2P communication through the connection shown in FIG. 7.

In step 4, VD-A sends a P2P data packet for VD-B to the V2X server. The payload of the data packet includes the B-ID.

In step 5, the data packet is received by the V2X server through NAT-A.

In step 6, the V2X server can know the destination address and port number (6.2.2.2:30000) of the data packet based on the B-ID in the data packet. The V2X server sends the data packet to VD-B. The V2X server removes the B-ID in the payload so that the VD-B can receive the data packet.

In step 7, NAT-B accepts the data packet since the information in the received data packet matches the filtering entry. Thus, VD-B can receive the data packet by VD-A.

In the P2P communication by the proposed relay, the message always goes through the V2X server. This is advantageous for the transmission of one-time, relatively urgent messages such as threat notifications.

Hereinafter, a method of performing P2P communication without going through a V2X server is proposed. This is advantageous for continuous message transmission such as chatting, etc.

Figure 9:
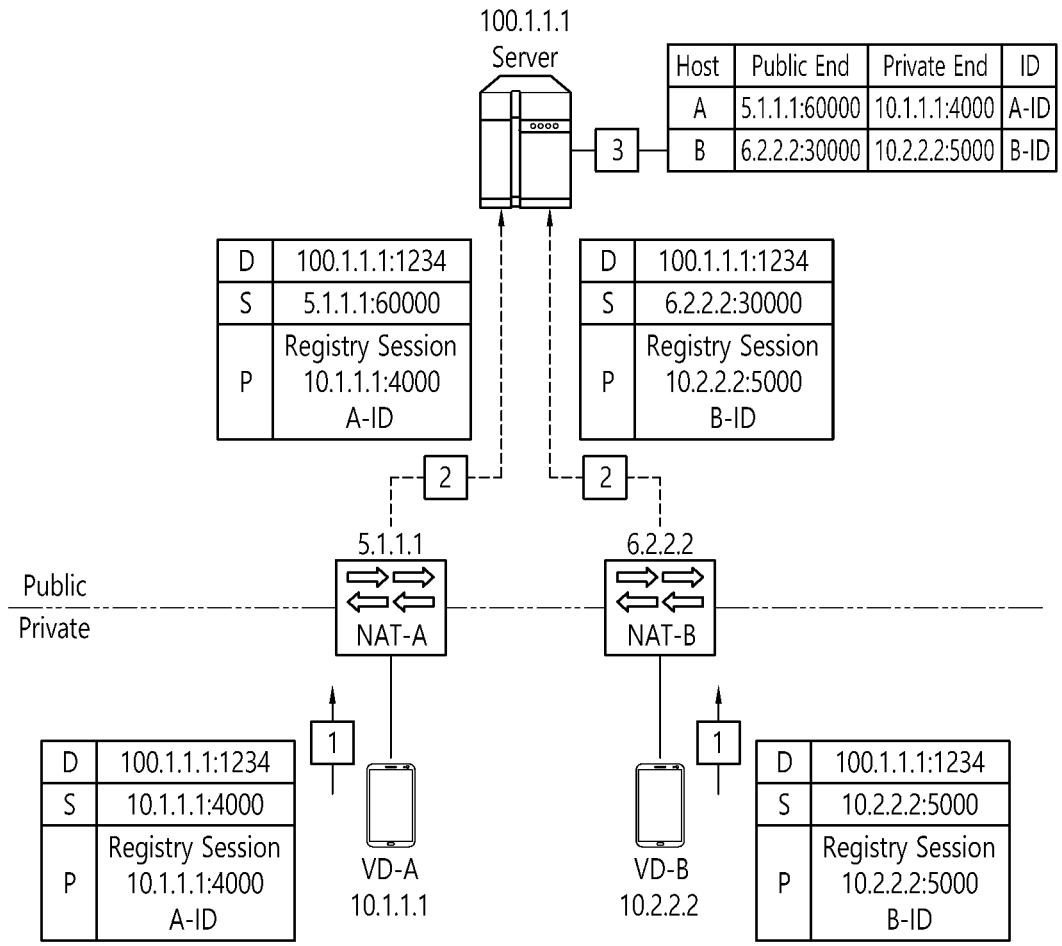
FIG. 9 shows a connection with a server in P2P communication for a V2X service.

FIG. 9 shows a connection with a server in P2P communication for a V2X service.

In step 1, VD-A and VD-B each transmits a registry session message for connection establishment to a V2X server. The payload of the registry message includes a private IP address/port number and V2X ID.

In step 2, the registry session messages are transmitted to V2X server through NAT-A/NAT-B. NAT-A and NAT-B store binding information and filtering information, as shown in FIG. 9. This is the case in which NAT has Endpoint-Dependent characteristics. If NAT has Endpoint-Independent property, Inbound Packet Filtering becomes NAT-A: Allow {AnyIP:AnyPort} to {5.1.1.1:60000}.

In step 3, the registry session messages received by the V2X server includes {source IP address, source port number} information of a V2X device changed by NAT and the payload of a V2X device that is not changed by NAT. The V2X server stores the public endpoint addresses, private endpoint addresses and V2X IDs of VD-A and VD-B.

Figure 11:
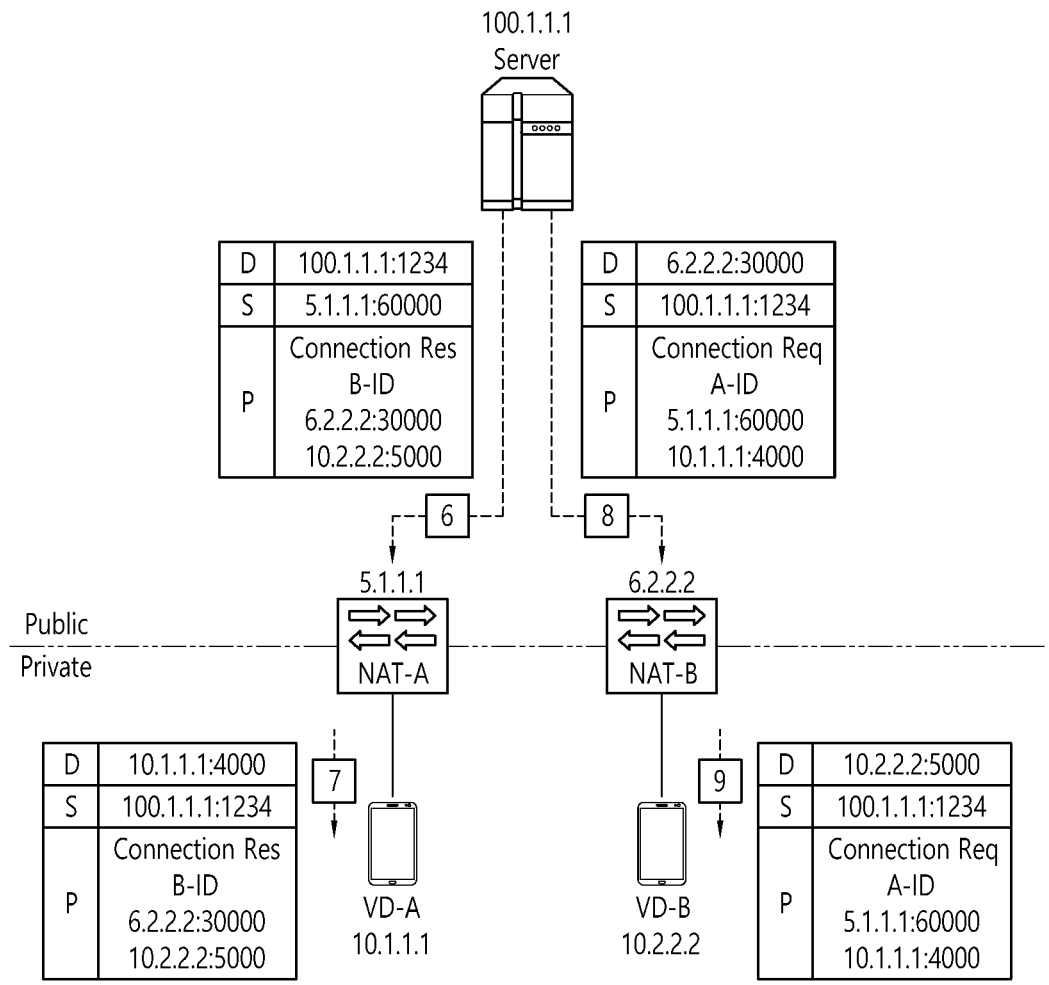

FIGS. 10 and 11 show a process of receiving information for P2P communication from a V2X server.

In step 4, VD-A that wants to perform P2P communication with VD-B sends a connection request message with B-ID to the V2X server.

In step 5, the connection request message is sent to the V2X server through NAT-A. NAT-A changes {source IP address: source port number} of the connection request message according to the binding information generated in step 2.

In step 6, the V2X server receiving the connection request message transmits a connection response message to VD-A. The V2X server can know that VD-A requests P2P communication with VD-B based on the B-ID in the connection request message. The connection response message contains the public endpoint address of VD-B and the private endpoint address of VD-B.

In step 7, NAT-A that has received the connection response message forwards this message to VD-A according to the filtering rule. VD-A can know the public endpoint address and private endpoint address of VD-B that wants P2P communication.

In step 8, the V2X server sends a connection request message including the address information (A-ID, public endpoint address, private endpoint address) of VD-A to VD-B. This step may be performed substantially simultaneously with step 6.

In step 9, NAT-B that received the connection request message accepts this message according to the filtering rules and sends it to VD-B. Accordingly, VD-B can also know the address information of VD-A.

According to steps 6 and 8, the peer private endpoint address is included in the message by the V2X server. This is to perform P2P communication based on private IP address without address translation by NAT when VD-A and VD-B are connected to the same NAT.

Figure 14:
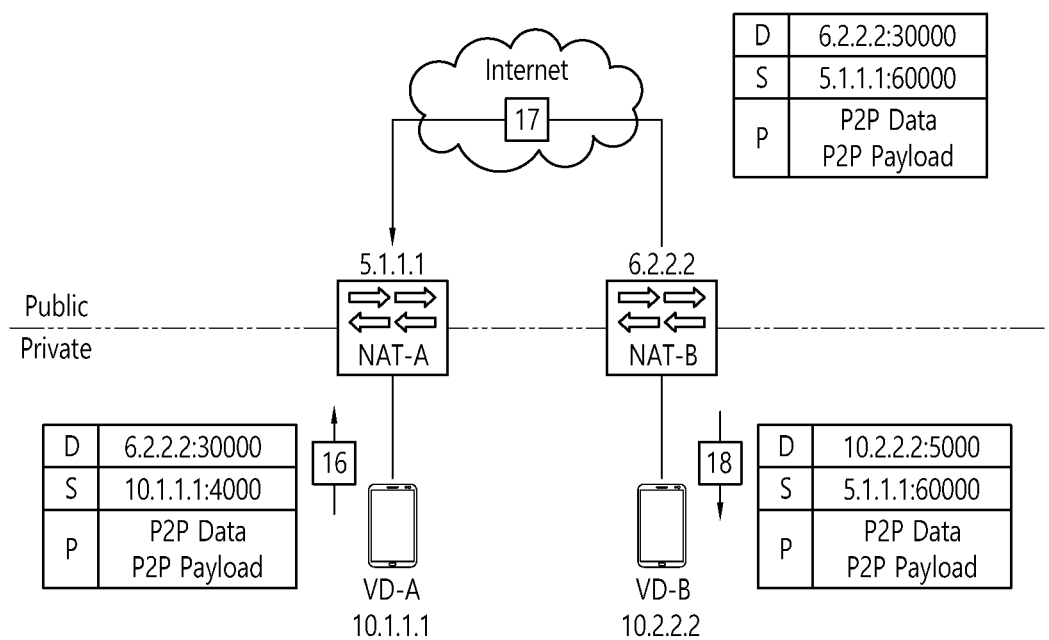

FIGS. 12 to 14 show a process of performing P2P communication.

In step 10, VD-A sends a first P2P data packet to VD-B. The destination address of the first P2P data packet is the public endpoint address of the VD-B. The first P2P data packet may include a ping request.

In step 11, the NAT-A receiving the first P2P data packet changes {source IP address: source port number} of the first P2P data packet according to the binding information. Then, a filtering rule for the new destination VD-B is added. This process for generating filtering rule is UDP hole punching.

In step 12, the NAT-B that has received the first P2P data packet drops it. This is because the source information of the received packet does not exist in the current filtering information of NAT-B.

In step 13, VD-B sends a second P2P data packet to VD-A. The destination address of the second P2P data packet is the public endpoint address of VD-A. The second P2P data packet may include a ping request.

In step 14, the NAT-B receiving the second P2P data packet changes {source IP address: source port number} of the first P2P data packet according to the binding information. Then, a filtering rule for the new destination VD-A is added. Now, NAT-B has also completed UDP hole punching.

In step 15, the NAT-A receiving the second P2P data packet sends the second P2P data packet to the VD-A according to the filtering rule generated in step 11. Eventually, VD-A successfully receives the second P2P data packet.

In step 16, VD-A sends a third P2P data packet to VD-B.

In step 17, the third P2P data packet passes through NAT-A.

In step 18, according to the filtering rule generated in step 14, NAT-B forwards the received third data packet to VD-B.

After the connection request is established through the V2X server, P2P communication between two V2X devices is possible. By sharing the peer device's V2X ID, public IP address, and private IP address with each other, peer-to-peer communication is possible regardless of different NATs or the same NAT.

FIG. 15 shows an example of a protocol stack to which a P2P function is added.

A P2P application layer for P2P service and a P2P message layer for P2P connection and message processing are added. Datagram TLS (DTLS) is used for security for P2P communication, and UDP is used as a transport layer.

Figure 16:
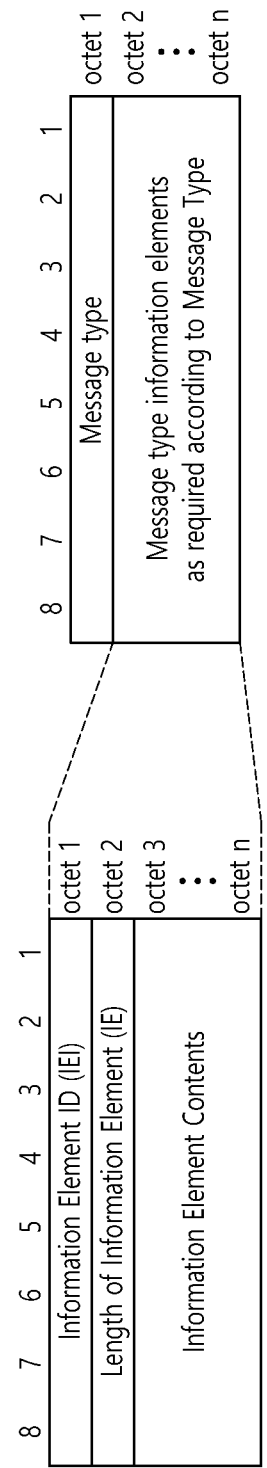
FIG. 16 shows an example of a proposed message format for P2P communication.

FIG. 16 shows an example of a proposed message format for P2P communication.

An information element (IE) is included in the UDP payload. The table below shows an example of a message type.

TABLE 2

| Type ID | Message Type |
|---|---|
| 1 | Registry Session |
| 2 | Connection Request |
| 3 | Connection Response |
| 4 | Ping Request |
| 5 | Ping Response |
| 6 | P2P Data |

Figure 17:
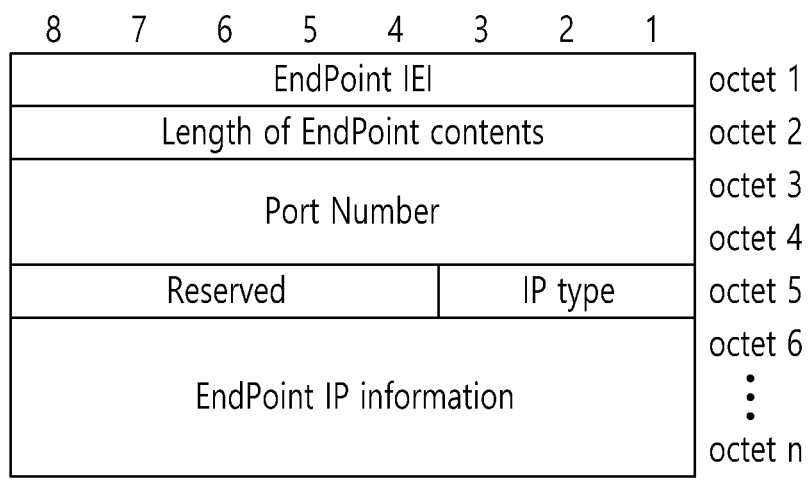
FIG. 17 shows the IE format for endpoint information.

FIG. 17 shows the IE format for endpoint information.

The IP type indicates whether the endpoint IP information is IPv4 or IPv6. The length of the endpoint IP information may be 4 octets for IPv4 and 16 octets for IPv6.

Figure 18:
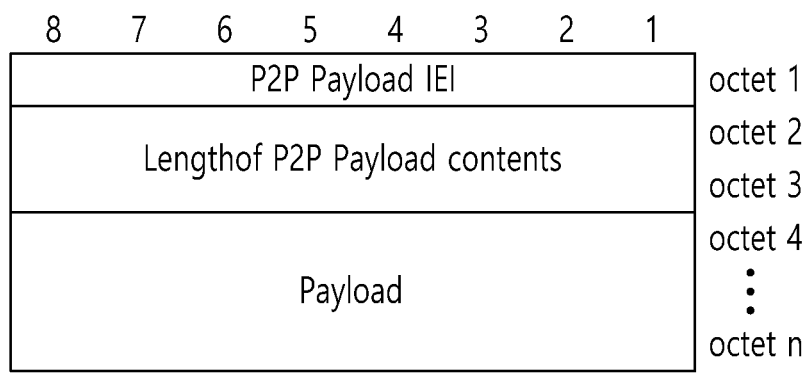
FIG. 18 shows an IE format for a P2P payload.

FIG. 18 shows an IE format for a P2P payload.

The table below is the IE format for the registry session message. Names and lengths in the table below are only examples. 'M' stands for 'Mandatory', 'O' stands for 'Optional', 'V' stands for 'Value', and 'TLV' stands for 'Type, Length, Value'. A host V2X ID indicates a V2X ID of a V2X device that transmits the message. Peer V2X ID indicates a V2X ID of a V2X device to receive the message.

TABLE 3

| IEI | IE | Reference | Presence | Format | Length |
|---|---|---|---|---|---|
| | Registry Session ID | Message type | M | V | 1 |
| | Host V2X ID | | M | V | 4 |
| 50 | Host Private endpoint | Endpoint info. | O | TLV | 9-21 |

The table below is the IE format for the connection request message.

TABLE 4

| IEI | IE | Reference | Presence | Format | Length |
|---|---|---|---|---|---|
| | Connection Request ID | Message type | M | V | 1 |
| | Peer V2X ID | | M | V | 4 |
| | Peer Public Endpoint | Endpoint info. | O | TLV | 9-21 |
| 50 | Peer Private endpoint | Endpoint info. | O | TLV | 9-21 |

When the V2X device sends a connection request message to the V2X server as a destination, optional IE is not included. When a V2X device sends a connection request message to a peer V2X device as a destination, optional IE is included.

The table below is the IE format for the connection response message. This message is sent by the V2X server to the V2X device that sent the connection request.

TABLE 5

| IEI | IE | Reference | Presence | Format | Length |
|---|---|---|---|---|---|
| | Connection Response ID | Message type | M | V | 1 |
| | Peer V2X ID | | M | V | 4 |
| | Peer Public Endpoint | Endpoint info. | O | TLV | 9-21 |
| 50 | Peer Private endpoint | Endpoint info. | O | TLV | 9-21 |

The table below is an IE format for a ping request message. A ping request is used to establish a connection or keep a connection alive. The ping request can be sent up to k times at intervals of m until a ping response is received. For example, m may be 1 second and k=5, but there is no limitation.

TABLE 6

| IEI | IE | Reference | Presence | Format | Length |
|---|---|---|---|---|---|
| | Ping Request ID | Message type | M | V | 1 |
| | Host V2X ID | | M | V | 4 |
| | Peer V2X ID | | M | V | 4 |

The table below shows the IE format for the ping response message.

TABLE 7

| IEI | IE | Reference | Presence | Format | Length |
|---|---|---|---|---|---|
| | Ping Response ID | Message type | M | V | 1 |
| | Host V2X ID | | M | V | 4 |
| | Peer V2X ID | | M | V | 4 |

The table below shows the IE format for the P2P data.

TABLE 8

| IEI | IE | Reference | Presence | Format | Length |
|---|---|---|---|---|---|
| | P2P Data ID | Message type | M | V | 1 |
| | Host V2X ID | | M | V | 4 |
| | Peer V2X ID | | M | V | 4 |
| 51 | Payload | P2P Payload | O | TLV | 4-n |

Since the P2P data IE may have a large payload size, the length of the IE may be represented by 2 bytes. The payload in the P2P data IE may include all P2P application data and/or V2X information (see Table 1). P2P data can also be used in a relaying method when the destination address of UDP is designated as a V2X server.

Figure 19:
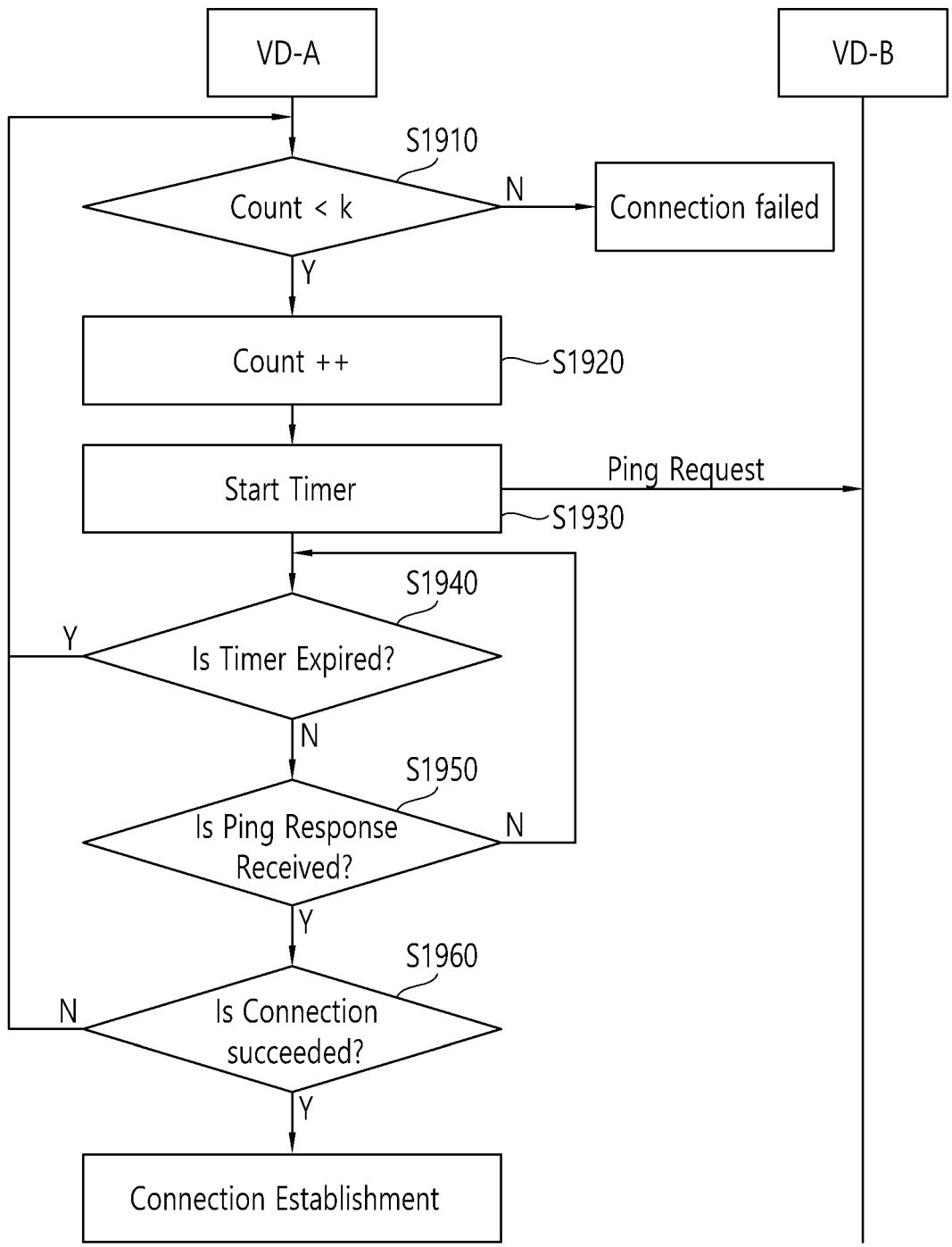
FIG. 19 shows a process in which a connection is established using a ping process.

FIG. 19 shows a process in which a connection is established using a ping process.

In steps S1910 and S1920, if the ping request exceeds the maximum number of retransmissions (k), the connection fails.

In step S1930, VD-A sends a ping request for connection establishment to VD-B. Then, a timer is started.

In step S1940, when the timer expires, it is checked whether retransmission is performed.

In step S1950, while the timer is running, it is checked whether a ping response is received.

In step S1960, when a ping response is received, VD-A checks whether a ping response is sent by VD-B. When a host V2X ID in the ping response matches a V2X ID of VD-B, and a peer V2X ID in the ping response matches a V2X ID of VD-A, a P2P connection is established.

Figure 20:
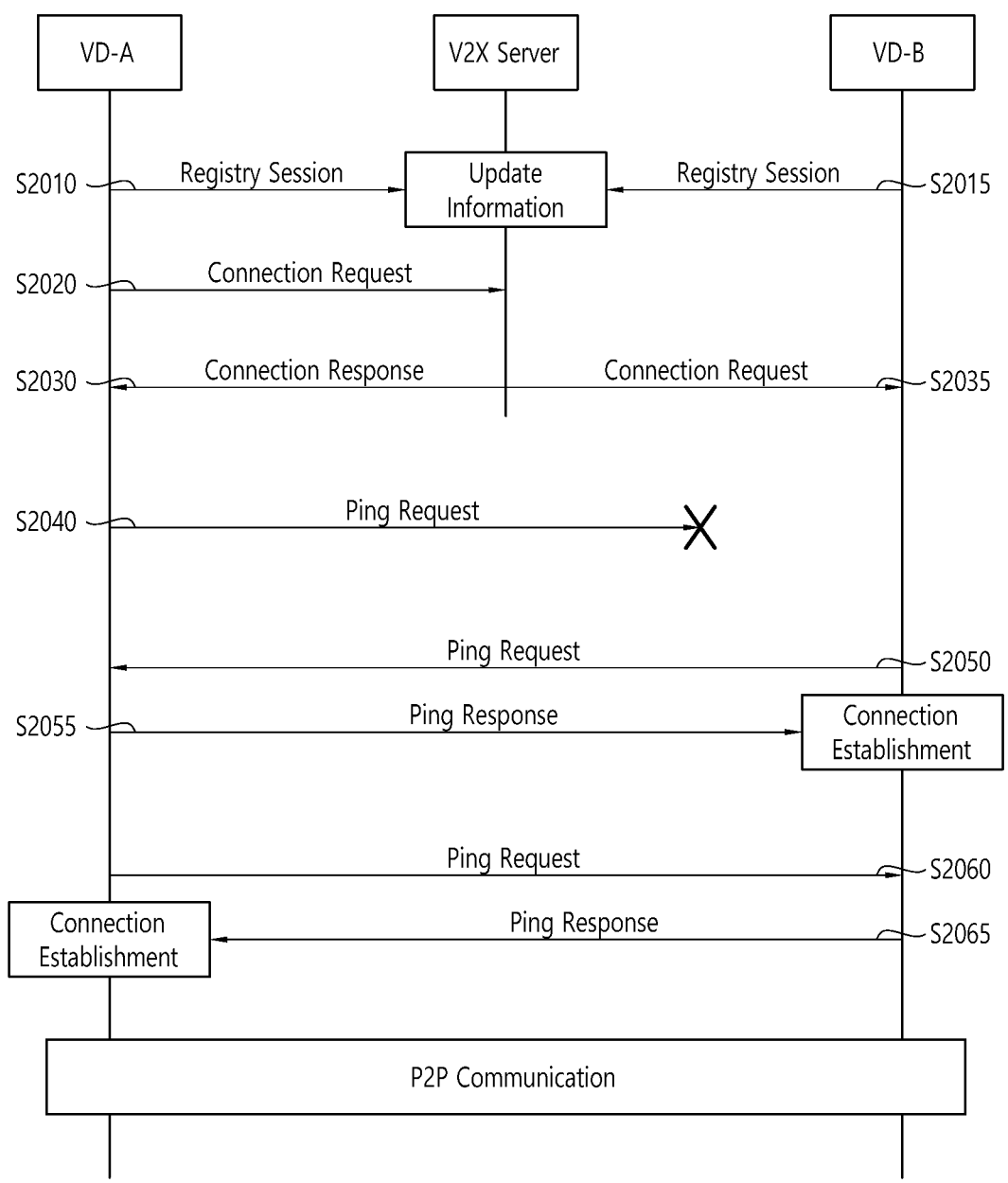
FIG. 20 shows a P2P communication process for V2X according to an embodiment of the present specification.

FIG. 20 shows a P2P communication process for V2X according to an embodiment of the present specification.

In step S2010, VD-A sends a registry session message having its own private IP address and V2X ID to the V2X server. In step S2015, VD-B sends a registry session message having its own private IP address and V2X ID to the V2X server.

In step S2020, VD-A desiring P2P communication with VD-B sends a connection request message to the V2X server.

In step S2030, the V2X server sends a connection response message to VD-A. And, in step S2035, the V2X server sends a connection request message to the VD-B.

In step 2040, VD-A (or VD-B) sends a ping request message to VD-B (or VD-A). The first ping request message sent is discarded by NAT. After that, the ping request message goes through the NAT.

In step 2050, VD-B sends a ping request message to VD-A. In step S2055, VD-B, having received the ping response message from VD-A, establishes a P2P connection.

In step S2060, VD-A sends a ping request message to VD-B. In step S2055, VD-A having received the ping response message from VD-B establishes a P2P connection. Normal P2P communication is now possible.

Figure 21:
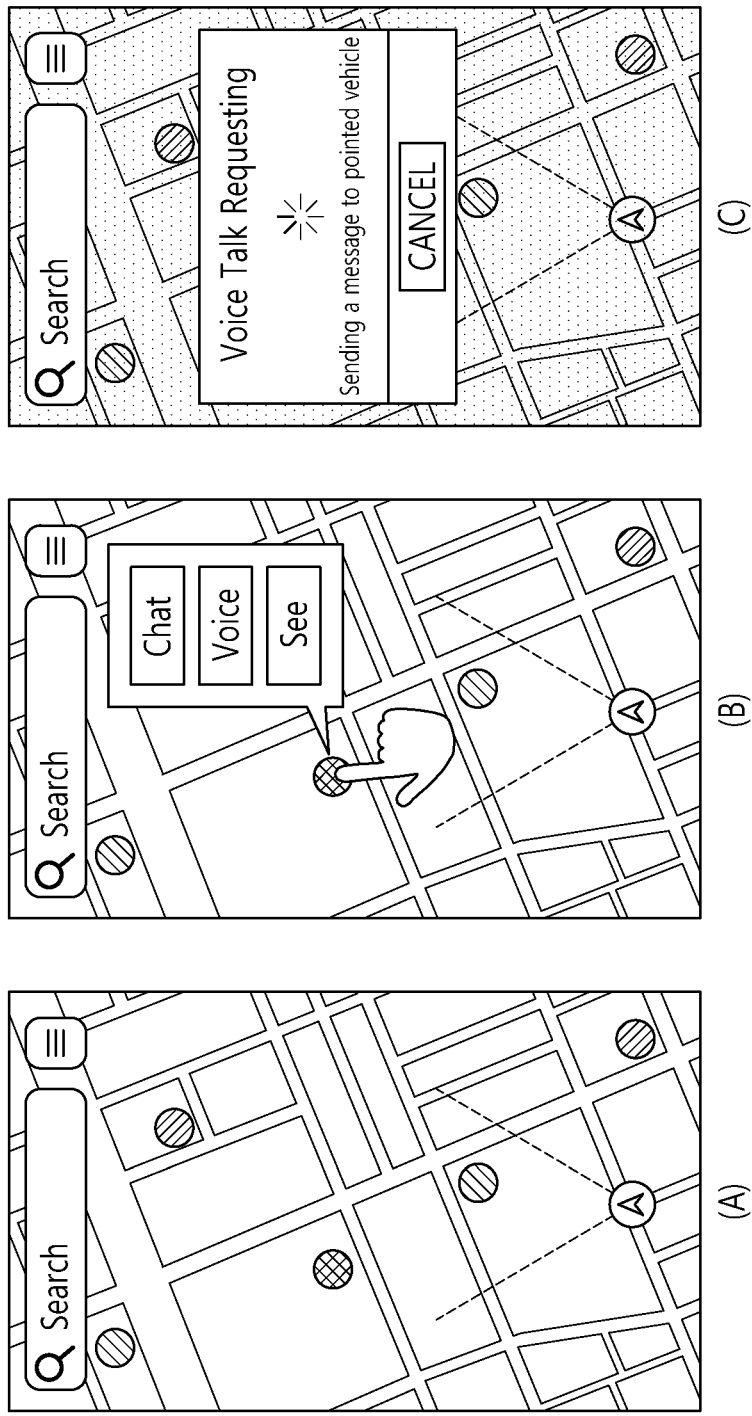
FIG. 21 shows an example of an application to which P2P communication for V2X is applied.

FIG. 21 shows an example of an application to which P2P communication for V2X is applied.

According to the sub-figure (A) of FIG. 21, surrounding V2X devices are displayed on the map on the screen of the host V2X device. The area in which the surrounding V2X devices are displayed may correspond to the subscription area.

According to the sub-figure (B) of FIG. 21, the user may select a peer V2X device that wants P2P communication among the surrounding V2X devices. Here, 'Chat', 'Voice', and 'See' are illustrated as services for P2P communication, but this is only an example.

According to the sub-figure (C) of FIG. 21, the host V2X device requests P2P communication to the selected peer V2X device.

FIG. 22 shows another example of an application to which P2P communication for V2X is applied.

According to the sub-figure (A) of FIG. 22, an interface screen of a peer V2X device that has received a voice talk request for P2P communication is shown. The user can choose to accept or reject.

According to the sub-figure (B) of FIG. 22, when the peer V2X device accepts P2P communication, an interface screen of the host V2X device is displayed. When the host V2X device displays 'Voice Talk Accepted', the user can press OK and initiate a voice talk with the other party.

The operation of P2P connection is as follows. Request and acceptance for P2P communication are based on token method. For example, when an application implementing the embodiment is installed on a mobile phone, Q (Q>1) tokens are allocated. Each time a request is executed, the token is decremented. Each time the request is granted, the token is incremented. Therefore, in order to make a request, it is required to approve the request of the other party, so that the request and the acceptance can be performed fairly with each other.

Each V2X device must re-establish a P2P connection when the IP address is changed. Each NAT may delete the entry if the data corresponding to the binding and filtering entry is not received for a certain period of time. Each V2X device is required to periodically transmit specific data (e.g., ping request) to maintain a P2P connection. If the V2X device does not send a ping request for a certain period of time, NAT automatically deletes the entry and the connection is disconnected. Whether or not the P2P connection is maintained may be checked according to whether a ping response in response to the ping request is received. If a ping response is received, the connection is maintained. If a ping response is not received, it is determined that the connection is disconnected and the connection establishment process may be restarted.

In the above examples, although the methods have been described based on the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

What is claimed is:

1. A device for vehicle-to-everything (V2X) service, the device comprising:
   a processor; and
   a memory operatively coupled with the processor and configured to store instructions that, when executed by the processor, cause the server device to perform functions comprising:
   transmitting a subscription request for requesting a subscription to a V2X server, the subscription request including information on a subscription area;
   transmitting a registry session message to the V2X server, the registry session message including a first V2X ID of the device and a private internet protocol (IP) address of the device, the first V2X ID including a value randomly selected by the device to identify the device;
   receiving a V2X message of a peer device forwarded by the V2X server, wherein the V2X server receives the V2X message from the peer device located in the subscription area, the V2X message including a second V2X ID which includes a value randomly selected by the peer device to identify the peer device;
   transmitting a connection request message for requesting a peer-to-peer (P2P) connection with the peer device to the V2X server, the connection request message including the second V2X ID;
   receiving a connection response message from the V2X server, the connection response message including the second V2X ID of the peer device, a public IP address of the peer device and a private IP address of the peer device, the public IP address of the peer device being an IP address that is translated by a network address translation (NAT) from the private IP address of the peer device; and
   establishing the P2P connection with the peer device based on the public IP address of the peer device.

2. The device of claim 1, wherein establishing the P2P connection with the peer device includes:

transmitting a ping request to the peer device, the ping request including the public IP address of the peer device; and receiving a ping response from the peer device as a response to the ping request.

3. A method for vehicle-to-everything (V2X) service, the method performed by a V2X device and comprising:
- transmitting a subscription request for requesting a subscription to a V2X server, the subscription request including information on a subscription area;
- transmitting a registry session message to the V2X server, the registry session message including a first V2X ID of the V2X device and a private internet protocol (IP) address of the V2X device, the first V2X ID including a value randomly selected by the device to identify the V2X device;
- receiving a V2X message of a peer device forwarded by the V2X server, wherein the V2X server receives the V2X message from the peer device located in the subscription area, the V2X message including a second V2X ID which includes a value randomly selected by the peer device to identify the peer device;
- transmitting a connection request message for requesting a peer-to-peer (P2P) connection with the peer device to the V2X server, the connection request message including the second V2X ID;
- receiving a connection response message from the V2X server, the connection response message including the second V2X ID of the peer device, a public IP address of the peer device and a private IP address of the peer device, the public IP address of the peer device being an IP address that is translated by a network address translation (NAT) from the private IP address of the peer device; and
- establishing the P2P connection with the peer device based on the public IP address of the peer device.

4. The method of claim 3, wherein establishing the P2P connection with the peer device includes:
- transmitting a ping request to the peer device, the ping request including the public IP address of the peer device; and
- receiving a ping response from the peer device as a response to the ping request.

5. A non-transitory computer-readable medium having computer-readable instructions stored thereon that are executable by a processor to perform functions comprising:
- transmitting a subscription request for requesting a subscription to a vehicle-to-everything (V2X) server, the subscription request including information on a subscription area;
- transmitting a registry session message to the V2X server, the registry session message including a first V2X ID of a V2X device and a private internet protocol (IP) address of the V2X device, the first V2X ID including a value randomly selected by the device to identify the V2X device;
- receiving a V2X message of a peer device forwarded by the V2X server, wherein the V2X server receives the V2X message from the peer device located in the subscription area, the V2X message including a second V2X ID which includes a value randomly selected by the peer device to identify the peer device;
- transmitting a connection request message for requesting a peer-to-peer (P2P) connection with the peer device to the V2X server, the connection request message including the second V2X ID;
- receiving a connection response message from the V2X server, the connection response message including the second V2X ID of the peer device, a public IP address of the peer device and a private IP address of the peer device, the public IP address of the peer device being an IP address that is translated by a network address translation (NAT) from the private IP address of the peer device; and
- establishing the P2P connection with the peer device based on the public IP address of the peer device.

6. The non-transitory computer-readable medium of claim 5, wherein establishing the P2P connection with the peer device includes:
- transmitting a ping request to the peer device, the ping request including the public IP address of the peer device; and
- receiving a ping response from the peer device as a response to the ping request.

* * * * *